United States Patent
Thomas et al.

(10) Patent No.: US 6,925,637 B2
(45) Date of Patent: Aug. 2, 2005

(54) LOW-CONTENTION GREY OBJECT SETS FOR CONCURRENT, MARKING GARBAGE COLLECTION

(75) Inventors: Stephen Paul Thomas, Bucks (GB); William Thomas Charnell, Bucks (GB); Stephen Darnell, Maidenhead (GB); Blaise Abel Alec Dias, Uxbridge (GB); Philippa Joy Guthrie, Bucks (GB); Jeremy Paul Kramskoy, Long Kitton (GB); Jeremy James Sexton, Hemel Hempstead (GB); Michael John Wynn, Maidenhead (GB); Keith Rautenback, Bucks (GB); Wayne Plummer, Bucks (GB)

(73) Assignee: Esmertec AG, Dubendorf (CH)

( * ) Notice: Subject to any disclaimer, the term of this patent is extended or adjusted under 35 U.S.C. 154(b) by 374 days.

(21) Appl. No.: 09/858,826

(22) Filed: May 16, 2001

(65) Prior Publication Data

US 2002/0042807 A1 Apr. 11, 2002

Related U.S. Application Data

(63) Continuation of application No. PCT/GB99/00788, filed on Mar. 16, 1999.

(30) Foreign Application Priority Data

Nov. 16, 1998 (GB) .............................. 9825102

(51) Int. Cl.$^7$ ................................ G06F 9/45
(52) U.S. Cl. ................ 717/151; 707/205; 707/206; 717/120
(58) Field of Search ................ 717/124–128; 707/205–206; 711/170–173, 146–153

(56) References Cited

U.S. PATENT DOCUMENTS 4,675,829 A 6/1987 Clemenson
4,924,408 A 5/1990 Highland (Continued)

OTHER PUBLICATIONS

Java World—Di Giorgio—Jul. 1997—Use native methods to expand the Java environment.
Karaorman, M. et al.—jContractor: a reflective Java library to support design by contract –V 1616, Jul. 19–21, 1999, pp. 175–196, Saint–Malo, Fr.
Java Native Interface Specification—Java Native Interface Specification Release May 16, 1997, Sun Microsystems, Inc., California.
Dyadkin, L.J.—Multibox Parsers—ACM Sigplan Notices, Association for Computing Machinery, New York, vol. 29, No. 7, Jul. 1, 1994, p. 54–60.

*Primary Examiner*—Anil Khatri
*Assistant Examiner*—Lawrence J Shrader
(74) *Attorney, Agent, or Firm*—Caesar, Rivisc, Bernstein, Cohen & Pokotilow, Ltd.

(57) ABSTRACT

A method and system of carrying out garbage collection in a computer system. Specifically, the method and system utilize low contention grey object sets for concurrent marking garbage collection. A garbage collector traces memory objects and identifies memory objects according to a three-color abstraction, identifying a memory object with a certain color if that memory object itself has been encountered by the garbage collector, but some of the objects to which the memory object refers have not yet been encountered. A packet manager organizes memory objects identified with the certain color into packets, provides services to obtain empty or partially full packets, and obtain full or partially full packets, and verifies whether a packet of the certain color is being accessed by one of the threads of the garbage collector.

12 Claims, 5 Drawing Sheets

U.S. PATENT DOCUMENTS

| | | |
|---|---|---|
| 5,210,876 A | 5/1993 | Uchida |
| 5,301,260 A | 4/1994 | Miyashita |
| 5,301,325 A | 4/1994 | Benson |
| 5,339,436 A | 8/1994 | Tairaku et al. |
| 5,367,685 A | 11/1994 | Gosling |
| 5,442,792 A | 8/1995 | Chun |
| 5,450,575 A | 9/1995 | Sites |
| 5,452,457 A | 9/1995 | Alpert et al. |
| 5,469,574 A | 11/1995 | Chang et al. |
| 5,530,964 A | 6/1996 | Alpert et al. |
| 5,551,040 A | 8/1996 | Blewett |
| 5,590,332 A | 12/1996 | Baker |
| 5,598,561 A | 1/1997 | Funaki |
| 5,603,030 A | 2/1997 | Gray et al. |
| 5,613,120 A | 3/1997 | Palay et al. |
| 5,655,122 A | 8/1997 | Wu |
| 5,675,804 A | 10/1997 | Sidik et al. |
| 5,721,854 A | 2/1998 | Ebcioglu et al. |
| 5,761,513 A | 6/1998 | Yellin et al. |
| 5,764,989 A | 6/1998 | Gustafsson et al. |
| 5,815,720 A | 9/1998 | Buzbee |
| 5,835,771 A | 11/1998 | Veldhuizen |
| 5,848,274 A | 12/1998 | Hamby et al. |
| 5,857,104 A | 1/1999 | Natarjan et al. |
| 5,872,978 A | 2/1999 | Hoskins |
| 5,873,104 A | 2/1999 | Tremblay et al. |
| 6,341,293 B1 * | 1/2002 | Hennessey .................. 707/206 |
| 6,490,599 B2 * | 12/2002 | Kolodner et al. ........... 707/206 |
| 6,510,498 B1 * | 1/2003 | Holzle et al. ................ 711/153 |

* cited by examiner

LOW-CONTENTION GREY OBJECT SETS FOR CONCURRENT, MARKING GARBAGE COLLECTION

CROSS-REFERENCE TO RELATED APPLICATIONS

This is a continuation of International Application PCT/GB99/00788, filed on Mar. 16, 1999, which claims priority to U.K. Patent Application GB9825102.8, filed on Nov. 16, 1998, now abandoned, and all of whose entire disclosures are incorporated by reference herein.

BACKGROUND OF INVENTION

1. Field of Invention

The present invention relates to a method of operating a garbage collector (especially a concurrent garbage collector) in a computer system, to a computer and computer system for garbage collection, to a computer-readable storage medium and to a Virtual Machine. In a preferred embodiment, the present invention relates to grey packets: low-contention grey object sets for concurrent marking garbage collection in a highly multi-threaded environment. At a general level, the invention is applicable to run-time environments; at a more specific level it is applicable to automatic dynamic memory management.

2. Description of Related Art

In recent years, there have been developments in programming languages towards what is known as an object-oriented language. In these developments, concepts are regarded as 'objects', each carrying with it a set of data, or attributes, pertinent to that object, as well as information relating to so-called 'methods', that is functions or subroutines, that can be performed on that object and its data. This is well known to those skilled in the art of computing and/or programming.

The advent and rapid advancement in the spread and availability of computers has led to the independent development of different types of systems, such as the IBM and IBM-compatible PC running IBM-DOS or MS-DOS or MS-Windows applications, the Apple Macintosh machines running their own Apple System operating system, or various Unix machines running their own Unix operating systems. This proliferation of independent systems has led to useful applications being available only in one format and not being capable of running on a machine for which the application was not designed.

Under such circumstances, programmers have devised software which 'emulates' the host computer's operating system so that a 'foreign' application can be made to run successfully in such a way that, as far as the user is concerned, the emulation is invisible. In other words, the user can perform all of the normal functions of say a Windows-based application on a Unix machine using a Unix-based operating system without noticing that he is doing so.

A particularly notable product of this type is that developed by Insignia Solutions of High Wycombe, GB and Santa Clara, Calif., USA and known under the name 'SoftWindows 2.0 for Powermac'. This software enables a physical Macintosh computer to emulate a PC having an Intel 80486DX processor and 80487 maths co-processor plus memory, two hard disks, IBM-style keyboard, colour display and other features normally found on recent versions of the PC-type of computer.

Furthermore, there is an ever-increasing demand by the consumer for electronics gadgetry, communications and control systems which, like computers, have developed independently of one another and have led to incompatibility between operating systems and protocols. For example, remote-control devices for video players, tape players and CD players have similar functions, analogous to 'play,' 'forward,' 'reverse,' 'pause,' etc, but the codes for transmission between the remote control, or commander, operated by the user may not be compatible either between different types of equipment made by the same manufacturer or between the same types of equipment made by different manufacturers. There would be clear benefits of having software within the equipment which can produce for example the correct 'play' code based upon a 'play' command regardless of the specific hardware used in the equipment. Such software is commonly known as a 'Virtual Machine.'

Other uses and applications are legion: for example, set-top boxes for decoding television transmissions, remote diagnostic equipment, in-car navigation systems and so-called 'Personal Digital Assistants.' Mobile telephones, for instance, can have a system upgrade downloaded to them from any service provider.

Emulation software packages tend to have certain features in common, notably that they are not general purpose but are dedicated. They are of most benefit in rapid development areas and have a distinct advantage in enabling manufacturers to cut costs. In particular, they can divorce software from the physical machine, i.e., the effect of the software in the physical machine can be altered by the emulating software without having to go into the machine's native software to implement those changes.

The specific object-oriented language used in some of the implementations described later is that known as Java (registered trade mark to Sun Microsystems Corporation). Some of the following implementations will enable Java to be used in smaller devices than is currently possible because of the improved performance and/or reduced memory footprint. Future uses projected for embedded software (virtual machines) include computers worn on the body, office equipment, household appliances, and intelligent houses and cars.

While it is recognised that there are clear advantages in the use of virtual machines, especially those using object-oriented languages, there are naturally areas where it is important and/or beneficial for some of the operations that are carried out within the system to be optimised. These may include reducing the memory requirement, increasing the speed of operation, and improving the 'transparency' of the system when embedded in another system. One of the principal aims of the inventions described herein is to provide a Virtual Machine which is optimised to work as quickly as possible within a memory constraint of, for example, less than 10, 5, 2 or even 1 Mbyte. Such a constraint is likely to be applicable, for example, to electronics gadgetry and other equipment where cost (or size) is a major constraint.

Reference is made herein to "memory objects". These are typically arbitrary discrete areas of memory organised into fields, some of which may be references to other objects or even to the same object (not to be confused with the objects in object oriented programming).

For efficient use of memory in a computer system, it is important that some mechanism is in place which will allow memory to be released for reallocation so that it may be used again once its current use is expended.

Such 'memory management' may typically be 'manual,' where the program itself contains code indicating that it requires memory to perform a function and code indicating when it has finished using that memory, or 'automatic' where the program does not inform the computer system when it has finished with memory and instead the system itself has to implement some way of identifying and recovering expended memory. The latter is conveniently referred to as 'garbage collection' and relies on the computer system initiating a process in which it searches through the memory objects currently being utilised by a program. Any such objects which are encountered during the search are regarded as currently in use whilst others not encountered cannot be currently in use and may be regarded as dead and therefore available for reallocation.

In previous attempts to effect garbage collection (GC), three specific techniques have been proposed. In the first, known as 'reference counting,' the number of references or pointers to various memory objects are maintained and the system looks for an occasion when a reference changes to zero, thereby indicating that the object previously pointed to has become 'free' for reallocation. A disadvantage with this technique is that it is inefficient in multithreaded environments and is unable to detect when cyclic structures (for example, when object A refers to object B, which refers back to A again) have become garbage.

In the second technique, known as 'copying,' memory is divided into two sections, identified in FIG. 1A as the 'FROM space' 12102 and the 'TO space' 12104. Memory for objects is allocated at linearly increasing addresses within FROM space 12101 until it is full. At that point all work is forced to stop for GC which copies all live objects 12106 into a more compact area 12108 in the 'TO space' 12104. References are also changed at the same time to take account of the new locations in the 'TO space' 12104. The roles of the FROM and TO spaces are then reversed and new memory allocation continues but now using the TO space in the same way as the previous FROM space was used. The major disadvantages with this technique are the additional memory requirement and the down time incurred every time there is a GC routine implemented and a change over of roles between the FROM and TO spaces.

The third technique, a so-called 'mark/sweep' technique, involves all memory being located in one logical unit containing objects. GC is invoked when there is no region of memory in the heap large enough to satisfy an allocation request, at which point it will colour all objects "white" and trace all possible paths through references to live objects. Any objects reached by the GC are coloured "black" and regarded as live, while areas not reached remain "white" and can be regarded as dead and available for reallocation. The final stage of the technique involves a 'sweep' operation in which all areas marked white are released and work is allowed to continue.

In more detail, with the mark/sweep technique, as can be seen from FIG. 1B, in the marking (tracing) phase, when an object is encountered but not all of the objects it refers to have been visited, it is marked as grey and references to it are put into a data structure 12202 in the form of a memory stack termed the grey stack. (In this connection, a typical memory stack may be regarded as a memory store of variable size in which items are successively added from top to bottom so that the 'youngest' items are nearest the bottom of the stack. This convention is for illustrative purposes only. It makes no difference to the operation of the stack whether new items are systematically added to the top or to the bottom.) FIG. 1B also shows at 12204 a memory heap, which is the storage area for memory objects, including their coloration.

The references themselves are also investigated by looking at the first reference in the data structure. That reference is removed from the grey stack and the object it refers to is coloured "black." Then any references 12206 in the object to other objects which have not yet been encountered by the tracing process are pushed onto the grey stack, and those objects are recolored "grey." Each object, shown enlarged at 12208 for convenience in FIG. 1B, includes an indication 12210 of the black/white status of the reference and pointers such as 12212 to other objects in a stack. The process is repeated until the grey stack is empty. Subsequent to the tracing process there is the sweep phase in which what is black is made white and what is white is made available for future use. At the end of the garbage collection, it will be understood that the grey stack ceases to exist.

The major disadvantage with the mark/sweep (tracing) technique is the lost down time while work stops, and its greater complexity than either of the two previous techniques. Its major advantage against copying GC is that there is little or no spatial redundancy.

In so-called 'concurrent' environments, objects could be being manipulated whilst they are being traced. With reference to FIG. 1C, specifically a reference field "b" (12306) in an object could be updated to refer to a different reference "d" (12308). If the object A being updated (designated 12302) is "black" (that is it has been fully traced by the GC) while the new object B (designated 12304) is "white", then there is a risk that B could be mis-identified as dead if A becomes the only route to B. This occurs because the GC has no reason to revisit A, so B will never be traced. Systems using concurrent GC use a "write barrier" to trap such situations, colouring B objects "grey" and pushing references to them onto the grey stack. Since there is only normally one grey stack for each Virtual Machine, there are likely to be contentions for usage of memory and of the grey stack when under use by GC.

Indeed, the set of grey objects is a resource shared amongst several threads of control, all of which could alter it. Hence any alteration must be policed by a locking mechanism of some kind. The grey set is used heavily during the tracing process, so there is a high probability that any attempt to gain access to the grey set will find it already in use. In addition, any overheads incurred by the locking mechanism will tend to be magnified. In other words, in concurrent GC other parts of the system can be attempting to alter objects while the GC is still tracing through methods to locate the live and dead memory locations. Special measures may need to be taken in order to prevent a live object being identified incorrectly as dead and thereby being reallocated. Corruption and/or loss of data could thereby result. A typical solution to this problem has been to use a 'write barrier' on all operations which could alter the contents of objects.

A further problem for GC is that space for the entire grey stack has to be allocated at the start of the GC cycle and usually has to be large enough to cope with the worst eventuality, even though it is highly unlikely that that will occur. Hence, most of the space set aside for the grey stack is wasted.

BRIEF SUMMARY OF THE INVENTION

The invention can be regarded as relating in one aspect to the management of the grey queue (or stack) in order to overcome the problem that there is a lot of contention for access to the grey stack.

In one aspect the present invention provides a method of operating a garbage collector in a computer system, the garbage collector having (typically at a given time) a set of partially traced memory objects (typically 'grey' objects), the method including handling the set of partially traced memory objects in a plurality of discrete packets (or dividing the set of partially traced memory objects into the plurality of discrete packets).

By handling the set in a plurality of discrete packets, the set only occupies the space that it needs to. This can be contrasted with the known grey stack, which is essentially of large, fixed size.

The garbage collector may, for example, be an incremental or pausing garbage collector. However, preferably, for speed of operation, the garbage collector is a concurrent garbage collector. (Typically a concurrent garbage collector operates concurrently with the execution of at least one other thread of control; that is it does not prevent mutation occurring at the same time as the garbage collection. In a non-concurrent garbage collector the collector's thread is the only thread which is running, and so no locking is required). In this case, preferably each packet is accessible by at most one thread of control at any given time. This can limit the amount of locking required to the occasions when a thread finishes with one packet and needs another to work on. This, in turn, can improve the performance of a GC in a very heavily used system and/or reduce the memory requirement of the computer system, by releasing memory no longer in use.

Preferably, different packets can be accessed by different threads of control at the same time. This can enhance the degree of concurrency in the system.

In order to enhance concurrency, the packets are preferably treated separately so that they can be used by different threads.

Preferably, each packet that is currently in use by a particular thread of control is marked as 'checked out' and each packet that currently has no particular thread of control using it is marked as 'checked in', and only checked out packets can be operated on by the particular thread of control, whereas for each checked in (grey) packet preferably a mutual exclusion lock is imposed before its contents can be read by a thread. This can afford a convenient way of managing the packets.

The minimum number of packets is two, as described later, one is for filling up with references to grey objects, the other is for emptying during "blackening." The packets are preferably sufficiently long to afford the advantages of division into packets and avoid the disadvantage of using too much memory (especially when multiple threads are executing), but preferably not so long that they are unmanageable and give rise to an excessive number of locks. Hence, preferably each packet contains a number of slots, one per reference to an object, the number being one of at least 2, 5, 10, 50 or 100. Equally, preferably each packet contains a number of slots, one per reference to an object, the number being one of less than 5,000, 1,000, 500 or 100. These rough sizes have been found to be optimum over a wide range of uses.

A less important measure of the size of the packets is their length in terms of the number of bytes. Preferably, this is a power of two. Preferably, each packet is one of at least 8, 16, 32, 64, 128 and 256 bytes long. Preferably, each packet is less than one of less then 1024, 512, 256, 128 and 64 bytes long.

Preferably, each packet is of a fixed size. Preferably, each packet contains a fixed number of slots and an indication (typically a header) of the number of slots currently in use within that packet.

In order to save on memory requirement, the packets are preferably created and destroyed in accordance with demand. In other words, the packets are dynamically managed in that they can be created or destroyed as required. As described later, the number of packets in existence is a function of the interval between the marking process and the blackening process.

Destruction of the packets may be achieved at least in part by merging together the contents of partially full packets. This feature can save on memory requirement.

In a closely related aspect, the present invention provides a computer system including a garbage collector, the garbage collector having a set of partially traced memory objects, and means for handling the set in a plurality of discrete packets.

Preferably, the garbage collector is a concurrent garbage collector.

Preferably, each packet is accessible by at most one thread of control at any given time.

Preferably, the computer system further includes means for rendering (or is adapted to render) different packets accessible by different threads of control at the same time.

Preferably, the computer system further includes means for treating (or is adapted to treat) the packets separately so that they can be used by different threads.

Preferably, the computer system further includes means for marking (or is adapted to mark) each packet that is currently in use by a particular thread of control as 'checked out' and each packet that currently has no particular thread of control using it as 'checked in,' and means for permitting operation only on checked out packets by the particular thread of control.

Preferably, each packet contains a number of slots, one per reference to an object, the number being one of at least 2, 5, 10, 50 or 100. Preferably also, each packet contains a number of slots, one per reference to an object, the number being one of less than 5,000, 1,000, 500 or 100. Each packet may be of a fixed size. Each packet may contain a fixed number of slots and an indication of the number of slots currently in use within that packet.

Preferably, the computer system further includes means for creating and destroying (or is adapted to create or destroy) the packets in accordance with demand.

Preferably, the computer system further includes means for destroying (or is adapted to destroy) the packets at least in part by merging together the contents of partially full packets.

In a closely related aspect, the invention provides a method of operating a concurrent garbage collecting system in a computer system in a multi-threaded environment, so as to release memory no longer in use, including:
    tracing the state of each object in a memory group;
    allocating an identifier according to whether the object has not yet been encountered during the tracing process (white), the object and all objects to which it refers have been encountered by the tracing process (black), and the object itself has been encountered but some of the objects it refers to have not yet been visited (grey);
    dividing the set or sets allocated with the grey identifier into discrete packets; and
    assigning a respective packet to each of the threads such that each thread can work on its respective packet independently of the other thread(s) and packet(s).

In a closely related aspect, the invention provides a computer system including:

a concurrent garbage collector (preferably a run time engine);

means for tracing the state of each object in a memory group;

means for allocating an identifier according to whether the object has not yet been encountered by the tracing means (white), the object and all objects to which it refers has been encountered by the tracing means (black), and the object itself has been encountered but some of the objects it refers to have not yet been visited (grey);

means for dividing the set or sets allocated with the grey identifier into discrete packets; and means for assigning a respective packet to each of the threads such that each thread can work on its respective packet independently of the other thread(s) and packet (s).

The invention extends to a computer system including means for operating a concurrent garbage collection system and means for dividing the grey queue into packets such that each packet is accessible by at most one thread at any given time.

In a closely related aspect the invention provides a method of operating a concurrent garbage collection system in a computer system environment, wherein the grey queue is divided into packets, each packet being accessible by at most one thread at any given time.

Preferably, the computer system is adapted to operate in a multi-threaded environment.

Preferably, the computer system further includes a manager for the packets.

The invention extends to a computer when programmed according to the above method.

The invention extends to a computer system including a garbage collector, the garbage collector having a set of partially traced memory objects, when programmed so as to handle the set of partially traced memory objects in a plurality of discrete packets.

The invention also extends to a computer-readable storage medium having a program recorded thereon, the program providing the above method.

In a closely related aspect the invention provides a computer-readable storage medium having a program recorded thereon, the program providing a method of operating a garbage collector in a computer system, the garbage collector having a set of partially traced memory objects, the method including handling the set of partially traced memory objects in a plurality of discrete packets.

The invention extends to a Virtual Machine including the above computer or computer system.

In a closely related aspect the invention provides a Virtual Machine when operated by the above method.

In a closely related aspect the invention provides a Virtual Machine when operated by means of the above computer-readable storage medium.

BRIEF DESCRIPTION OF THE SEVERAL VIEWS OF THE DRAWINGS

Preferred features of the present invention will now be described, purely by way of example, with reference to the accompanying drawings, in which.

DETAILED DESCRIPTION OF THE INVENTION

Figure 1:
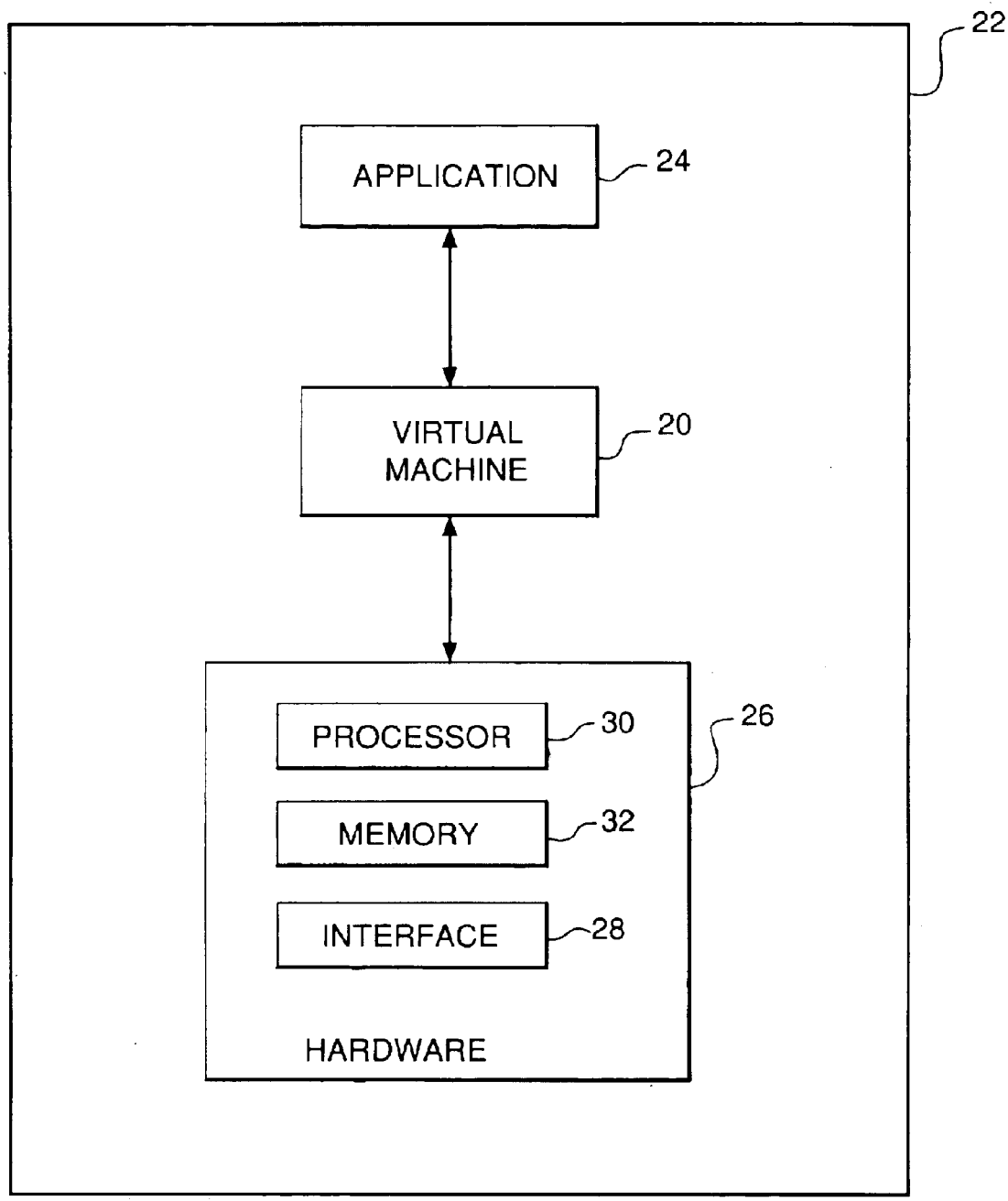
FIG. 1 shows certain components of the virtual machine.
Figure 1A:
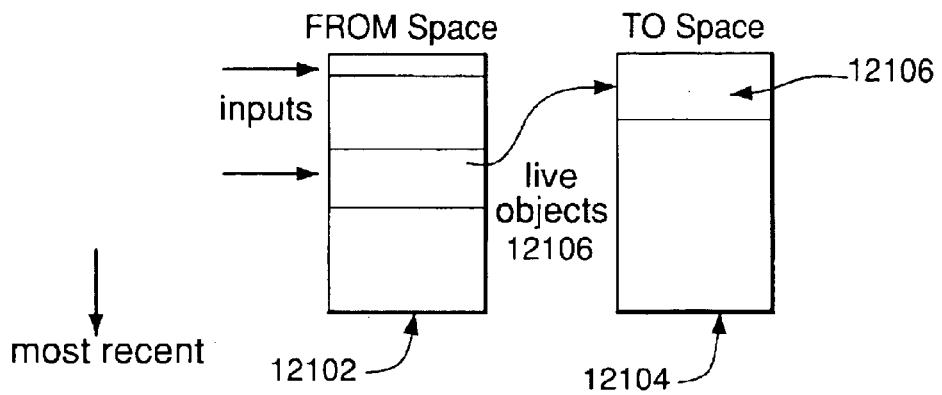
FIG. 1A shows the division of memory according to a prior art approach.
Figure 1B:
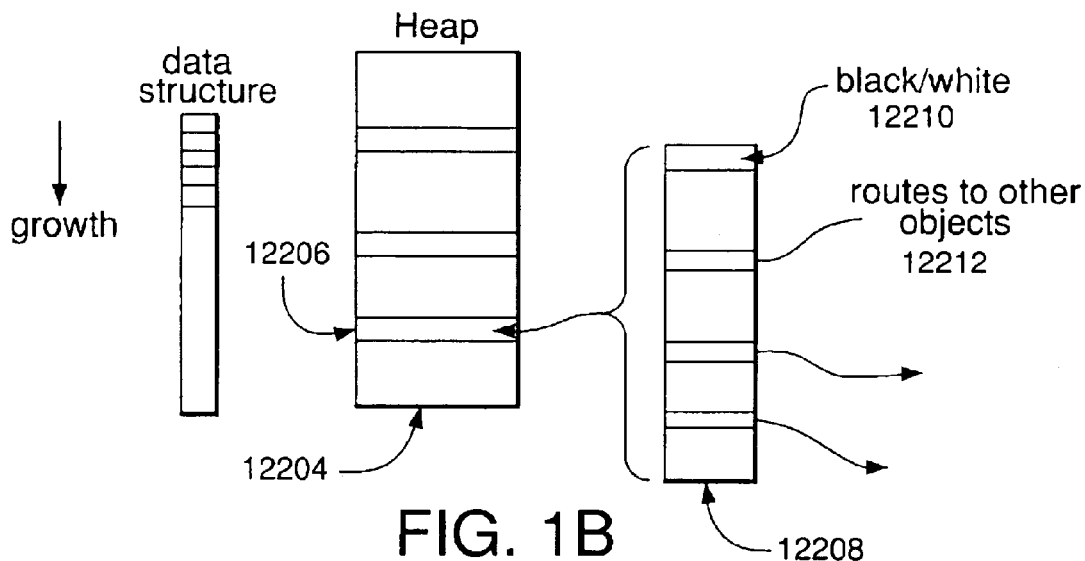
FIG. 1B illustrates another prior art approach.
Figure 1C:
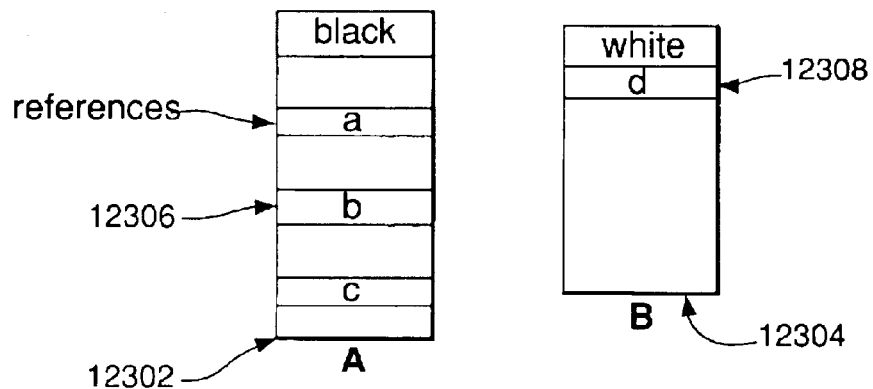
FIG. 1C shows an arrangement of objects in a so-called "concurrent" environment.

A specific example of a preferred embodiment of virtual machine is now described with reference to FIG. 1.

The virtual machine 20 is an executable code installed in the particular item of equipment 22. It can provide a degree of independence from the hardware and operating system. The virtual machine may typically include any, some, or all of the following features: an operating engine, a library of routines, one or more interpreters, one or more compilers, storage means for storing a plurality of instruction sequences, queue management means, and buffer management means.

The virtual machine is coupled to one or more applications 24 on one side (the "high level" side), and, on the other side (the "low level" side), perhaps via various intermediate logical units, to the hardware 26 of the item of equipment. The hardware can be regarded as including various ports or interfaces 28 (perhaps an interface for accepting user input); the virtual machine receives events from those ports or interfaces. The hardware also includes one or more processors/control means 30 and memory 32.

First a brief outline of the nature of the invention will be presented followed by a more comprehensive description of a particular manner in which the invention can be performed.

Garbage Collection (GC) is a process whereby a run-time environment can identify memory which was in use at one time, but is now no longer in use, and make the identified memory available for re-use for other purposes. Concurrent GC is a way of implementing GC such that other activity in a program or system does not need to be impeded by ongoing GC activity.

Figure 1D:
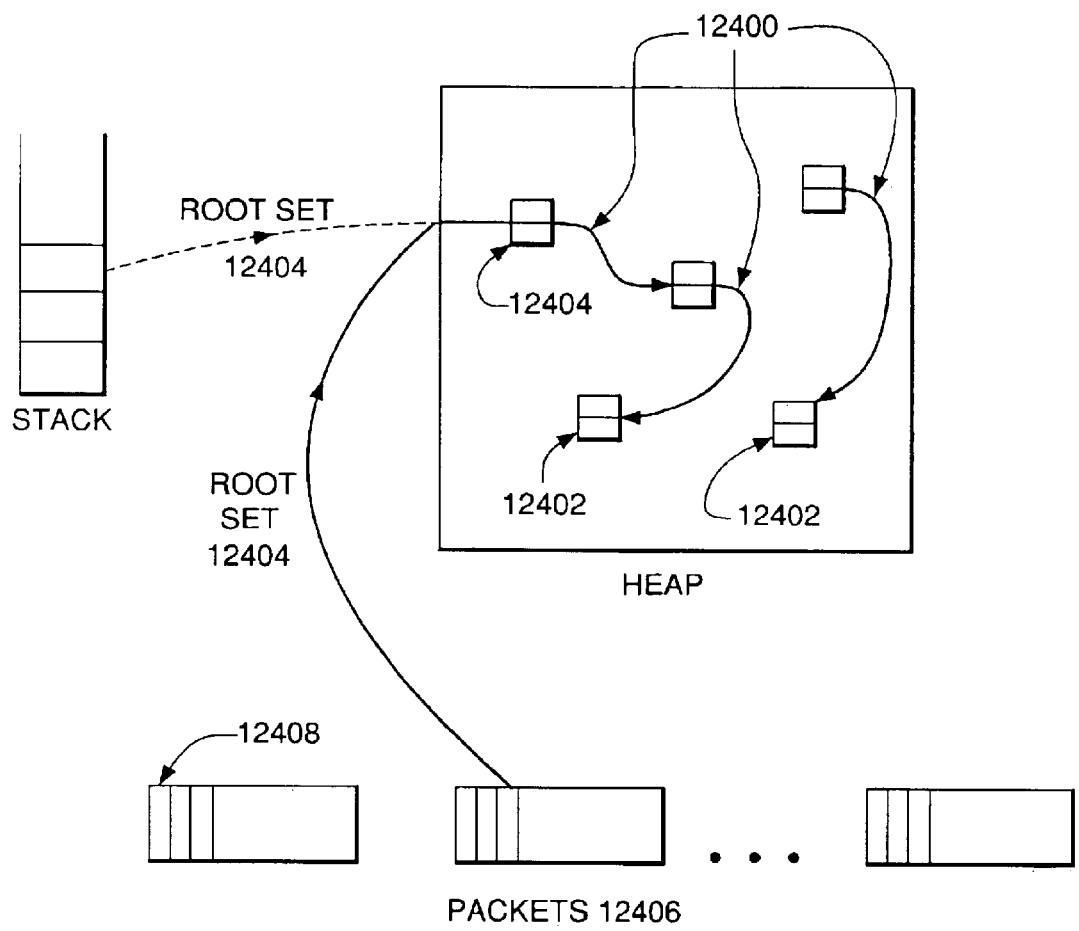
FIG. 1D shows the tracing of garbage collection work.

Tracing GCs (concurrent or otherwise) work by following references, indicated as arrows 12400 in FIG. 1D, between memory objects generally indicated as 12402, starting from some given root set 12404, to establish the set of all objects which must be treated as "live." Objects which are not in that set are deemed to be "dead" and their memory space can be recycled. The root set is some starting condition for the garbage collection, and is typically a set of public references including references on the stack of interest.

The state of the tracing process at any given time can be summarised using the Tricolour Abstraction. Each object has a colour associated with it White: This object has not been encountered yet during the tracing process.

Black: The object and all the objects it refers to have been encountered by the tracing process.

Grey: The object itself has been encountered, but some of the objects it refers to may not have been visited (in other words, the grey coloration effectively denotes work in progress).

Any tracing GC algorithm works as follows:

initially, colour all objects white recolour grey all objects immediately referenced from the root

```
while grey objects exist do
    let g be any grey object
    recolour g black
    for each object o referenced by g, do
        if o is white then
            recolour o grey
        endif
    endfor
endwhile
```

Once this algorithm is complete, the space occupied by any white objects can be reused.

Marking GCs tend to implement this abstraction fairly literally, while copying GCs do not, with an object's colour implicitly determined by its absolute location in memory. The present invention is concerned mainly with marking GC algorithms and techniques.

Figure 1E:
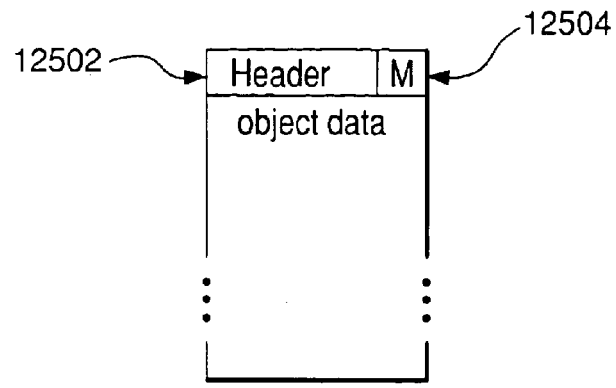
FIG. 1E shows the structure of an object.

In marling GC's, the colour of objects is stored within the object itself, as part of the object's header (12502 in FIG. 1E). The colour is encoded as mark information M; 12504, which is in one of four states, white, black, grey and free (that is, the object is available for allocation).

M will typically be a pair of bits which together allow the four distinct states to be encoded. Recolouring an object is a matter of altering the M state information in the object's header in the appropriate way. In the preferred embodiment, object coloration is stored for the lifetime of the object. Outside the operation of the GC, all objects are coloured white.

Figure 1F:
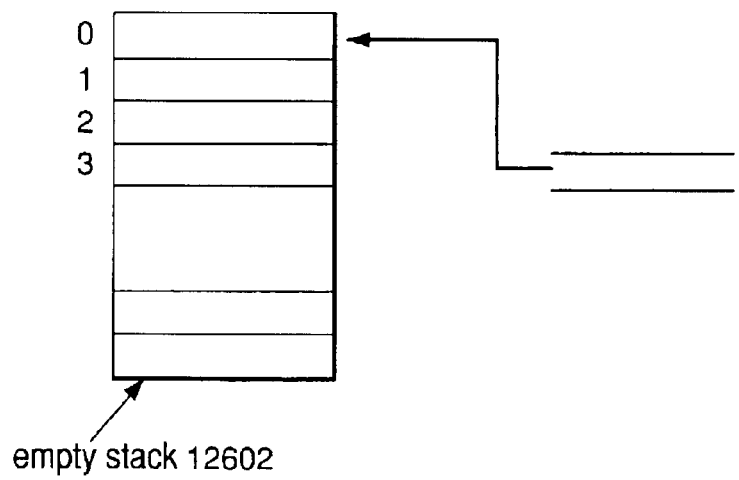
FIG. 1F shows an empty stack.

Efficiency considerations dictate that the set of grey objects can be treated as a discrete entity that can be added to (by recolouring grey) or be removed from (by recolouring black). This set has conventionally been implemented as a stack. Usually the grey stack tends to be an explicit stack or an array, with an additional index variable to indicate where reads and writes in the array occur. FIG. 1F shows an empty stack 12602.

In a concurrent GC algorithm, other parts of the system can be altering objects while the GC is still tracing. Unless care is taken, live objects can be misidentified as dead. A typical way of eliminating this problem is to use a write barrier on all operations that could alter the contents of objects. Different implementations can work in different ways, but they all tend to require that non-GC threads of control can alter the set of grey objects.

In general terms, instead of having a single monolithic grey object set which has to be locked as a whole on each access, the present invention divides the set into discrete segments, or packets, (see for example 12406 in FIG. 1D), preferably such that each thread can be apportioned a segment it (and only it) can work on in isolation. This can minimise the amount of locking required to the occasions when a thread finishes with one packet and needs another to work on. Hence the packets replace the grey stack entirely (which is why the arrow in FIG. 1D from the stack to the heap is shown dotted).

Hence, the present invention involves so-called "grey packets" and in particular the provision of low-contention grey object sets for concurrent marking garbage collection especially in a highly multi-threaded environment.

Some GCs move objects in memory. The system used here preferably does not because of the difficulty of doing so in a concurrent GC. Instead, a 'mark and sweep' operation is performed. Here, everything white is released at the end of the tracing or 'mark' process. Subsequent to the tracing process there is the sweep phase. In the sweep phase what is black is made white and what is white is made available for future use.

A grey packet manager (GPM) is provided by the technique described herein for managing the grey packets. The GPM comes into existence at the start of the program, but typically does not operate (except for housekeeping purposes) unless the garbage collector is also operating.

Any thread, especially but not limited to the GC thread, could make something grey. In, for example, a Virtual Machine (VM) the GPM is asked by the thread for its own memory for what is termed a grey packet in hand. One of the reasons for dividing the set of grey objects into separate packets is so that the thread has its own grey packet in hand. If the thread wants to continue writing into a grey packet which is full or very nearly so, the GPM gives that thread a new packet, takes away the full one and stores it. The GPM can keep a queue of empty packets in readiness. Any number of threads can have their own separate packets in hand, so that the grey stack can be divided into a number of regions of exclusive access, and no global locks are required.

Grey packets are like mini arrays, which are created and destroyed on demand. They are handled as complete packets. Grey packets typically are 256 bytes in size and can hold up to 60 references. It follows that only once in every 60 accesses does the grey packet need to communicate with the GPM. When there is no current GC there are no grey packets active.

The most useful features of this technique are that the amount of locking is minimised, there is dynamic creation and destruction of grey packets in accordance with demand, and there is the ability of the system to merge partially full packets so as to minimise memory requirements. Also, separation of full and partially full packets allows a degree of concurrency even within the GPM, so that if a call is made to the GPM, it is not a locked entity.

Figure 1G:
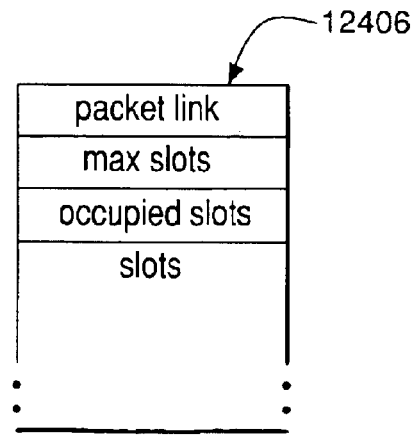
FIG. 1G shows the structure of an individual packet according to the present invention.

A set of grey packets 12406, as schematically illustrated in FIG. 1D, exists as blocks within the program or system. Each block contains a fixed number of slots 12408 (each capable of describing a single object reference), and an indication of how many slots are currently in use within that block. In the preferred embodiment, checked-in packets are grouped in sets, preferably linked to form chains. The structure of an individual packet 12406 is shown in FIG. 1G. Each grey packet is either checked out, in which case it is currently being used by one (and only one) particular thread of control, or checked in, in which case no particular thread of control is using it.

The grey packets are managed by a separate module within the program or system, the Grey Packet Manager, or GPM. The GPM maintains the following resources, internally:

full: a list of full packets.

partial: a list of partially full packets.

Each of the above lists has a separate lock to control access to it. A packet is checked in if it is present in either of the above lists.

Externally, the GPM offers the following fundamental services.

getEmptyPacket( ): obtain an empty packet (or partially filled packet, but not a full packet) from the set of checked in packets, alter its status to checked out, and return it to the calling thread.

getFullPacket( ): obtain a full packet (or partially filled packet, but not an empty packet) from the set of checked in packets, alter its status to checked out, and return it to the calling thread. Return NULL if only empty packets are present.

submitPacket(p): Verify that grey packet p is currently checked out, and then alter its status to checked in.

The GPM performs each of the above operations under lock.

The GPM can handle the packets in any order it chooses; there is no system of "Last In, First Out".

Externally, the GPM is used with the following API:
getEmptyPacket( )
   acquire lock in partial list
   let p be partial list head pointer.
   if p is NULL,
      allocate a new packet block p.
      initialize p's occupied field to 0.
   else
      let partial list head pointer be p's successor.
      while p is not completely empty and partial list head is not NULL,
         let m be the minimum of the number of occupied slots in p and the number of unoccupied slots in partial list head pointer.
         copy the contents of m occupied slots in p into unoccupied slots in partial list head packet
         increment occupied slots count in partial list head packet by m.
         decrement occupied slots count in p by m.
         if partial list head packet is full,
            let f be partial list head pointer.
            let partial list head pointer be f's successor.
            submitFullPacket(f).
         endif
      endwhile
   endif
   release lock on partial list
   return p.
getFullPacket( )
   acquire lock on full list.
   if full is empty,
      release lock on full list
         ;as soon as the lock on the full list is released the full packet can be used—this allows some degree of concurrency even within the GPM
      acquire lock on partial list.
      let p be partial list head pointer.
      if p is not NULL,
         let partial list head pointer be p's successor packet.
      endif
      release lock on partial list
   else
      let p be full list head pointer.
      let full list head pointer be p's successor packet.
      release lock on full list
   endif
   return p.
submitFullPacket(p)
   acquire lock on full list
   let p's successor packet be full list head packet.
   let full list head pointer be p.
   release lock on full list
submitEmptyPacket(p)
   deallocate grey packet block pointed to by p.

Each thread of control (including the GC) has a thread local packet-in-hand (or tl-pih) grey packet pointer. This pointer may be NULL (indicating that the thread has no packet in hand), but if non-NULL it must refer to a checked out packet.

Marking an object i as grey becomes:
   if tl-pih is NULL then
      tl-pih=getEmptyPacket( )
   else if tl-pih is full then
      submitFullPacket(tl-pih)
      tl-pih=getEmptyPacket( )
   endif
   recolor i grey
   set the next unoccupied slot in tl-pih to be i.
   increment the occupied slots fields in tl-pih (that is, insert i into tl-pih).

A packet is said to be full if its occupied field matches the maximum number of slots possible in the packet.

The main blackening algorithm becomes:
   obtain a packet p to blacken
   while p is not NULL do
      for each reference g in p
         recolor g black
         for each object i referenced from g do
            if i is white then
               mark i as grey
            endif
         endfor
      endfor
      submitEmptyPacket(p)
      obtain a packet p to blacken
   endwhile Obtaining a packet to blacken is:
   if tl-pih is not NULL then
      let p be tl-pih
      tl-pih=NULL
   else
      let p=getFullPacket( )
   endif The idea is that both the marking and blackening processes operate only on the thread's packet in hand, which if present at all can be guaranteed not to be visible to any other thread. Hence, most of the time no locking is required, except when interaction with the GPM is required to submit packets, obtain empty packets or packets to blacken.

Periodically each non-GC thread submits any packet in hand back to the GPM (only the GC can blacken packets). This is typically done when the GC needs to examine a non-GC thread's local data structures. Since these packets may be partially complete, this is how the partial list in the GPM gains entries. Since it is desirable to have as few grey packets allocated as possible, getEmptyPacket( ) prefers where possible to make empty packets from the partial list by "fusing" the contents of two partial packets into a single, fuller packet, leaving behind an empty (or at least less full packet) which can be returned to the caller. A completely new empty packet is only created if the partial packet list is empty.

As will be seen from the above, the primary aim of this technique is to improve the performance of Concurrent GC in highly multi-threaded environments, by virtue of minimising locked accesses to a global data structure. Hence a commercial product utilising Concurrent GC with this technique will perform better than one using a more traditional approach.

A summary of some of the main functions of the Grey Packet Manager is presented in the table below. In the table, each function is shown underlined; the steps of that function follow the function itself. Each step is placed in one or two of three columns ("Full Packet", "Partial Packet" or "Empty Packet"), depending on whether the step is performed using full, partial or empty packets.

Full Packet Partial Packet Empty Packet
Marking phase—proceeds in the following repeated stages until there are no more objects to mark
(a) getEmptyPacket (get a new empty packet and mark it as grey)
(b) submitFullPacket (submit a full grey packet)
(c) getEmptyPacket (get a further new empty packet)
Blackening Phase—this proceeds repetitively until step (b) fails
(a) getFullPacket (for blackening purposes)
(b) submit "Empty" Packet (into the GPM)
Death of a Thread
On death of thread, submit any tl-pih back to the GPM
General Housekeeping
GC periodically submits tl-pih's of other threads into GPM Referring finally to FIG. 1H, the overall function of the preferred embodiment is now summarised, with particular reference to the flow of packets between the various main components.

Figure 1H:
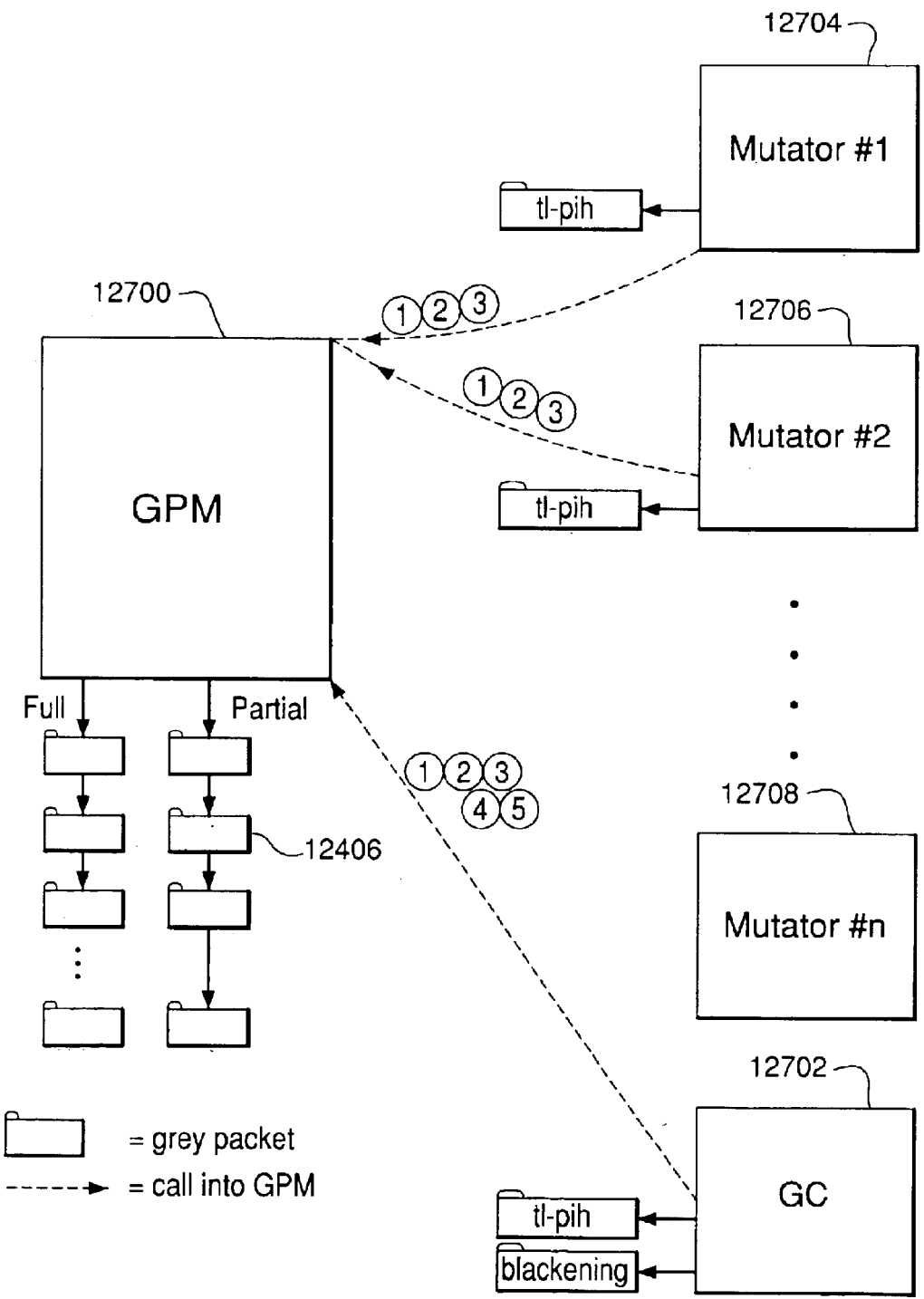
FIG. 1H shows the overall operation of the present invention.

In FIG. 1H, the grey packet manager (GPM) is denoted 12700, the garbage collector (GC) is denoted 12702, various threads of control ('mutators') are denoted 12704, 12706 and 12708, and the packets are denoted 12406. Thread 12708 represents the 'nth' mutator, and shows no flow of packets since it has not had a write barrier to trigger. The various packet flows are denoted by encircled numerals, whose meaning is as follows:

1) Get new empty packet
2) Submit full packet
3) Submit partial packet
4) Get full packet to blacken
5) Submit empty packet A general summary of GC technology, concurrent and otherwise, can be found in "Garbage Collection: Algorithms for Automatic Dynamic Memory Management" by Richard Jones and Rafael Lins, published by John Wiley, ISBN 0-471-94148-4. The disclosure of this document is hereby incorporated by reference.

In any or all of the aforementioned, certain features of the present invention have been implemented using computer software. However, it will of course be clear to the skilled man that any of these features may be implemented using hardware or a combination of hardware and software. Furthermore, it will be readily understood that the functions performed by the hardware, the computer software, and such like are performed on or using electrical and like signals.

Features which relate to the storage of information may be implemented by suitable memory locations or stores. Features which relate to the processing of information may be implemented by a suitable processor or control means, either in software or in hardware or in a combination of the two.

In any or all of the aforementioned, the invention may be embodied in any, some, or all of the following forms: it may be embodied in a method of operating a computer system; it may be embodied in the computer system itself; it may be embodied in a computer system when programmed with or adapted or arranged to execute the method of operating that system; and/or it may be embodied in a computer-readable storage medium having a program recorded thereon which is adapted to operate according to the method of operating the system.

As used herein throughout the term 'computer system' may be interchanged for 'computer,' 'system,' 'equipment,' 'apparatus,' 'machine,' and like terms. The computer system may be or may include a virtual machine.

In any or all of the aforementioned, different features and aspects described above, including method and apparatus features and aspects, may be combined in any appropriate fashion.

It will be understood that the present invention(s) has been described above purely by way of example, and modifications of detail can be made within the scope of the invention.

Each feature disclosed in the description, and (where appropriate) the claims and drawings may be provided independently or in any appropriate combination.

What is claimed is:

1. A method of carrying out garbage collection in a computer system having a plurality of memory objects in at least one memory group, the method comprising:

tracing a state of each memory object in the at least one memory group;

allocating an identifier to each memory object according to a three-color abstraction including;

coloring a memory object a first color if that memory object has not been encountered during the tracing process;

coloring a memory object a second color if that memory object and all objects to which that memory object refer have been encountered during the tracing process;

coloring a memory object a third color if that memory object is a partially traced memory object that itself has been encountered, but some of the objects to which the partially traced memory object refers have not yet been encountered;

allocating the memory objects colored the first color into a first set of unencountered memory objects represented as a first color data structure;

allocating the memory objects colored the second color into a second set of encountered memory objects represented as a second color data structure differing from the first color data structure;

allocating the partially traced memory objects colored the third color into at least one set of partially traced memory objects represented as a third color data structure differing from the first color data structure and the second color data structure;

dividing the at least one set of partially traced memory objects into a plurality of discrete packet data structures for containing the partially traced memory objects in the packet data structures separate from the objects in the first color data structure and the second color data structure;

creating new packet data structures to store additional partially traced objects on a demand basis;

merging partially full packet data structures to optimize memory allocation; and destroying unneeded packet data structures to free up memory on a demand basis.

2. A method as claimed in claim 1, wherein the computer system includes multiple threads, the method further comprising assigning one packet data structure to each thread such that each thread can access its one packet data structure independently of the other threads and packet data structures.

3. A method as claimed in claim 2, further comprising transferring packet data structures between the threads and a packet manager.

4. A method as claimed in claim 2, wherein the computer system includes a garbage collector, the method further comprising transferring packet data structures between the garbage collector and a packet manager.

5. A method as claimed in claim 1, further comprising marking packet data structures accessed by a thread as checked out.

6. A method as claimed in claim 5, further comprising marking packet data structures not accessed by a thread as checked in.

7. A method as claimed in claim 1, further comprising destroying at least some of the packet data structures.

8. A method as claimed in claim 7, wherein destroying at least some of the packet data structures includes merging the contents of partially full packet data structures.

9. A method as claimed in claim 1, wherein the color is grey.

10. A method as claimed in claim 1, wherein each packet data structure includes a plurality of slots.

11. A method as claimed in claim 10, wherein each packet data structure includes one slot per reference to a memory object.

12. A method as claimed in claim 1, wherein each packet data structure has a fixed size.

* * * * *